United States Patent
Hoffman et al.

(10) Patent No.: US 8,833,044 B2
(45) Date of Patent: Sep. 16, 2014

(54) HARVESTING HEAD WITH CONVEYOR DRIVE SYSTEM

(71) Applicant: Deere & Company, Moline, IL (US)

(72) Inventors: Daniel Hoffman, East Moline, IL (US);
Douglas J. Bollin, Kaiserslautern (DE);
Aaron S. Ritter, Milan, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/644,710

(22) Filed: Oct. 4, 2012

(65) Prior Publication Data

US 2014/0096497 A1 Apr. 10, 2014

(51) Int. Cl.
*A01D 34/00* (2006.01)
*A01D 43/06* (2006.01)

(52) U.S. Cl.
CPC ........................................ *A01D 43/06* (2013.01)
USPC ........................................................... 56/10.6

(58) Field of Classification Search
USPC ............... 56/181, 192, 11.2, 14.5, 10.6, 11.4; 198/314, 369.7, 370
See application file for complete search history.

(56) References Cited

U.S. PATENT DOCUMENTS

| | | | | |
|---|---|---|---|---|
| 3,214,002 A | * | 10/1965 | Kirkpatrick et al. | 198/369.7 |
| 4,429,517 A | * | 2/1984 | Lohrentz et al. | 56/181 |
| 4,512,140 A | * | 4/1985 | Blakeslee | 56/11.6 |
| 4,519,190 A | * | 5/1985 | Blakeslee | 56/181 |
| 4,522,018 A | * | 6/1985 | Blakeslee | 56/181 |
| 4,590,751 A | * | 5/1986 | Stephenson | 56/192 |
| 4,938,010 A | * | 7/1990 | Guinn et al. | 56/181 |
| 5,231,826 A | * | 8/1993 | Jennings | 56/11.4 |
| 5,272,860 A | * | 12/1993 | Baril et al. | 56/366 |
| 5,301,496 A | * | 4/1994 | Sudbrack et al. | 56/366 |
| 5,791,128 A | * | 8/1998 | Rogalsky | 56/14.5 |
| 6,205,757 B1 | * | 3/2001 | Dow et al. | 56/366 |
| 7,467,505 B2 | * | 12/2008 | MacGregor | 56/11.9 |
| 2001/0022070 A1 | * | 9/2001 | Eis et al. | 56/10.9 |

* cited by examiner

*Primary Examiner* — Árpád Fábián-Kovács

(57) ABSTRACT

A harvesting head (104) with conveyor drive system comprising a frame (106), on which are mounted a first conveyor deck (108) and a second conveyor deck (110) includes a plurality of hydraulic fluid flow control elements that are configured to reduce hydraulic fluid flow through at least one conveyor belt drive motor (124, 130) while shifting at least one conveyor deck (108, 110).

15 Claims, 2 Drawing Sheets

HARVESTING HEAD WITH CONVEYOR DRIVE SYSTEM

FIELD

This invention relates to agricultural harvesting heads. More particularly, it relates to deck shift arrangements for shifting conveyor decks of the agricultural harvesting heads.

BACKGROUND

Some agricultural harvesting heads (called "heads" or "headers" herein) include endless belt conveyors that receive cut crop material. These conveyors move the crop laterally with respect to the frame of the head. They may deposit the crop material on another conveyor mounted on the head, or they may deposit the cut crop material on the ground.

In some arrangements, the conveyors can be shifted from side to side on the frame of the head. In these arrangements a conveyor that is shifted is typically supported on a subframe that is movable with respect to the frame of the head. This movable subframe plus conveyor is commonly called a "deck". The process of moving the deck from side to side is commonly called "shifting" the "deck".

For each deck at least one motor is provided to recirculate the endless belt of that deck's conveyor around the deck thereby conveying cut crop material. For each deck at least a second motor is provided to shift the deck side to side on the frame of the head. These motors are typically hydraulic. They may be rotary motors or linear motors.

One problem with this arrangement is getting the conveyor decks to shift quickly and completely. Often hydraulic fluid is provided to the hydraulic motors in parallel, such that the hydraulic fluid is supplied to the motors to simultaneously shift the conveyor decks and run the conveyor belts. At times the conveyor decks do not receive enough hydraulic fluid to shift completely. As a result, the conveyor belts continue running before the decks are in position. This causes cut crop material to fall into gaps between the decks and onto the ground.

What is needed is a better system for operating the deck shift motors and the conveyor belt motors that causes the decks to shift completely and rapidly. It is an object of this invention to provide such a system.

SUMMARY

In accordance with one aspect of the invention, an agricultural harvesting head comprises a laterally extending frame and a first conveyor deck and a second conveyor deck mounted thereon.

A first deck shift motor is provided shift the first conveyor deck side to side on the frame.

A second deck shift motor is provided to shift the second conveyor deck side to side on the frame.

A first conveyor motor is provided to drive a first conveyor belt of the first conveyor deck in an endless path, the first conveyor belt being disposed to receive cut crop material on an upper surface thereof and to convey the cut crop material in one of two opposing and operator-selectable directions.

A second conveyor motor is provided to drive a second conveyor belt of the second conveyor deck in an endless path, the second conveyor belt being disposed to receive cut crop material on an upper surface thereof and to convey the cut crop material in one of two opposing operator selectable directions.

A hydraulic drive circuit is coupled to the first deck, shift motor, the second deck shift motor, the first conveyor motor and the second conveyor motor, to drive the first conveyor motor, the second conveyor motor, the first deck shift motor and the second deck shift motor.

An electronic control unit is coupled to the hydraulic circuit to sequence the operation of the first conveyor motor, the second conveyor motor, the first deck shift motor and the second deck shift motor such that the electronic control unit limits the supply of hydraulic fluid to the first conveyor motor and the second conveyor motor while the electronic control unit shifts the first conveyor deck, while the electronic control unit shifts the second conveyor deck or while the electronic control unit shifts both the first conveyor deck and the second conveyor deck.

An operator input device is coupled to the electronic control unit to electronically signal the electronic control unit of the operator's desired conveyor deck positions. These positions include a first configuration in which the first conveyor deck and the second conveyor deck are both shifted rightward to define a cut crop exit from the head on the left side of the head, a second configuration in which the first conveyor deck and the second conveyor deck are both shifted leftward to define a cut crop exit from the head on the right side of the head, and a third configuration in which the first conveyor deck and the second conveyor deck are both shifted outwardly (away from each other) to opposing lateral ends of the head to define a cut crop exit at the center of the head.

In accordance with another aspect of the invention, a harvesting head with conveyor drive system is provided, comprising a frame configured to extend perpendicular to a direction of travel during the harvesting process, a first conveyor deck supported on the frame for linear translating movement in two alternate opposing directions with respect to the frame that are parallel to a first deck axis of translation and normal to the direction of travel, the first conveyor deck comprising at least a first roller and a second roller supporting a first conveyor belt for recirculating belt movement and a first motor coupled to the first roller to drive the first conveyor belt in recirculating movement, a third motor coupled to the first conveyor deck to drive the first conveyor deck in two alternate opposing directions that are both parallel to the first deck axis of translation as selected by the operator, a second conveyor deck supported on the frame for linear translating movement in two alternate opposing directions with respect to the frame that are parallel to the first deck axis of translation and normal to the direction of travel, the second conveyor deck comprising at least a third roller and a fourth roller supporting a second conveyor belt for recirculating belt movement and a second motor coupled to the third roller to drive the second conveyor belt in recirculating movement, fourth motor coupled to the second conveyor deck to drive the second conveyor deck in two alternate opposing directions that are both parallel to the first deck axis of translation as selected by the operator; and a conveyor drive system coupled to the first, second, third and fourth motors and configured to reduce hydraulic fluid flow through the first and second motors while shifting either or both of the first and second conveyor decks.

The second conveyor deck may be disposed in an end-to-end relationship with the first conveyor deck such that the top surfaces of the first and second conveyor belts are generally coplanar and aligned end-to-end such that crop exiting the first conveyor deck will be transferred substantially entirely to the second conveyor deck when said first and second conveyor decks are shifted into immediately adjacent or abutting positions.

The first and second motors may be hydraulically coupled together in a series circuit, wherein said series circuit is coupled to and between a source of hydraulic fluid under pressure and a hydraulic fluid reservoir, wherein the conveyor drive system further comprises a first orifice, and further wherein a majority of hydraulic fluid flow through the first and second motors is forced through the first orifice when either of the conveyor decks are being shifted.

The majority of hydraulic fluid flow through the first and second motors may bypass the first orifice when the conveyor decks are not being shifted.

The conveyor drive system may further comprise a deck shift valve disposed to control the flow of hydraulic fluid to the third motor, and the deck shift valve may be electrically coupled to and controlled by an electronic control unit.

The harvesting head may further comprise, a first orifice disposed between a source of hydraulic fluid and the third motor to throttle hydraulic fluid flow to the third motor, and may further comprise a second orifice disposed between the source of hydraulic fluid and the fourth motor to throttle hydraulic fluid flow to the fourth motor.

The harvesting head may further comprise an operator input device, an electronic control unit coupled to the operator input device, and a first flow control valve coupled to the electronic control unit, and the first flow control valve is actuated by the electronic control unit in response to operator manipulation of the operator input device to change hydraulic fluid flow to first motor and second motor from a higher level of flow to a lower level of flow for a predetermined period of time, and may automatically restore the higher level of flow after the expiration of the predetermined period of time.

The harvesting head may further comprise a second flow control valve configured to regulate a flow of hydraulic fluid to the third motor, wherein the second flow control valve is coupled to the ECU, and further wherein the ECU is configured to actuate the second flow control valve and shift the first conveyor deck during the predetermined period of time.

In accordance with a third aspect of the invention, a conveyor drive system for a harvesting head is provided, the harvesting head including a frame configured to extend perpendicular to a direction of travel ("V") during the harvesting process, a first conveyor deck supported on the frame for linear translating bidirectional movement with respect to the frame in a first deck axis of translation normal to the direction of travel, the first conveyor deck comprising at least a first roller and a second roller supporting a first conveyor belt for recirculating movement and a first motor coupled to the first roller to drive the first conveyor belt in recirculating movement, a third motor coupled to the first conveyor deck to drive the first conveyor deck alternately in two opposing directions that are both parallel to the first deck axis of translation as selected by the operator, a second conveyor deck supported on the frame for linear translating bidirectional movement with respect to the frame in the first deck axis of translation, the second conveyor deck comprising at least a third roller and a fourth roller supporting a second conveyor belt for recirculating movement and a second motor coupled to the third roller to drive the second conveyor belt in recirculating movement, and a fourth motor coupled to the second conveyor deck to drive the second conveyor deck in two alternate opposing directions that are both parallel to the first deck axis of translation as selected by the operator, the conveyor drive system comprising a plurality of hydraulic fluid flow control elements couplable to the first, second, third and fourth motors, wherein said plurality of hydraulic fluid flow control elements are configured to reduce hydraulic fluid flow through the first and second motors while said plurality of hydraulic fluid flow control elements simultaneously shift either one or both of the first and second conveyor decks.

The conveyor drive system may further comprise a source of hydraulic fluid under pressure, a hydraulic fluid reservoir, and a first orifice, wherein the first and second motors may be hydraulically couplable together in a series circuit, the series circuit may be couplable to and between the source of hydraulic fluid under pressure and the hydraulic fluid reservoir, and the plurality of hydraulic fluid flow control elements may be configured to direct a majority of hydraulic fluid flow through the first and second motors through the first orifice when either of the conveyor decks are being shifted.

The plurality of hydraulic fluid flow control elements may be configured to direct the majority of hydraulic fluid flow passing through the first and second motors not through the first orifice when the conveyor decks are not being shifted.

The plurality of hydraulic fluid flow control elements further comprises an electronic control unit, and a deck shift valve configured to control the flow of hydraulic fluid to the third motor, and further wherein the deck shift valve is electrically coupled to and controlled by the electronic control unit.

The plurality of hydraulic fluid flow control elements may further comprise a first orifice configured to be disposed between a source of hydraulic fluid under pressure and the third motor to regulate a rate of hydraulic fluid flow to the third motor, and the plurality of hydraulic fluid flow control elements may further comprise a second orifice configured to be disposed between the source of hydraulic fluid under pressure and the fourth motor to regulate a rate of hydraulic fluid flow to the fourth motor.

The plurality of hydraulic fluid flow control elements may further comprise an operator input device, an electronic control unit coupled to the operator input device, a first flow control valve coupled to the electronic control unit and the first flow control valve may be actuated by the electronic control unit in response to operator manipulation of the operator input device to change hydraulic fluid flow to first motor and second motor from a higher level of flow to a lower level of flow for a predetermined period of time, and to automatically restore the higher level of flow after the expiration of the predetermined period of time.

The plurality of hydraulic fluid flow control elements may further comprise a second flow control valve configured to regulate a flow of hydraulic fluid to the third motor, the second flow control valve may be coupled to the ECU, and the ECU may be configured to actuate the second flow control valve and shift the first conveyor deck during the predetermined period of time.

DETAILED DESCRIPTION

Figure 1:
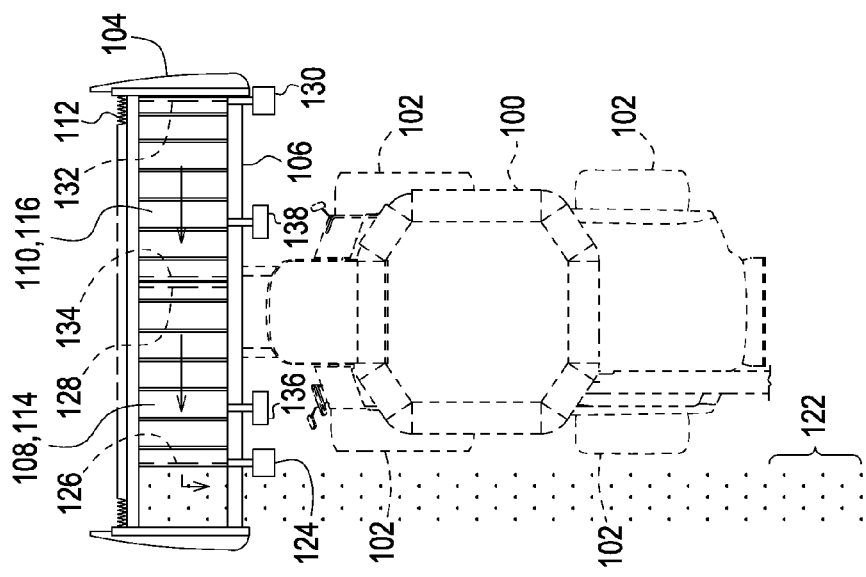
FIGS. 1-3 are plan views of an agricultural vehicle with an agricultural harvesting head attached, the agricultural harvesting head having two conveyor decks. In each of the Figures, the conveyor decks are identical, but are shown in alternative operating positions for harvesting crops the agricultural vehicle travels through the field.
Figure 2:
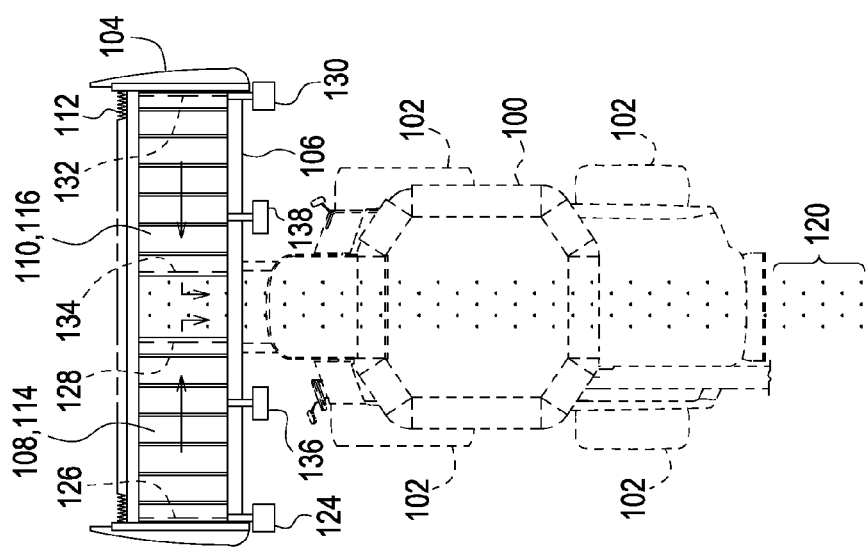
Figure 3:
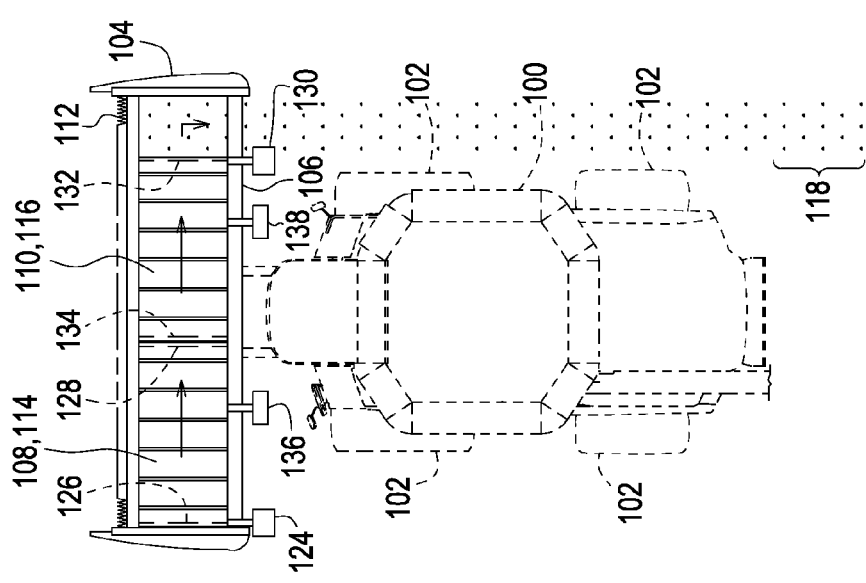

FIGS. 1-3 illustrate the three operating positions of the conveyor decks operated by the hydraulic circuit described herein.

In each of these Figures, an agricultural vehicle 100 is shown supported on four wheels 102 for travel, through an agricultural field in a direction "V" to harvest crops. An agricultural harvesting head 104 is supported on the front of agricultural vehicle 100 and extends in a direction generally transverse to the direction of travel V. Agricultural harvesting head 104 includes a frame 106 upon which are supported two conveyor decks 108, 110.

An elongate reciprocating knife 112 extends across substantially the entire width of the agricultural harvesting head 104.

As the agricultural vehicle 100 is driven through the field, reciprocating knife 112 severs the roots of the plants causing them to fall backwards on to the upper surfaces of conveyor belts 114, 116. The conveyor belts move in the direction indicated by the arrows superimposed on their upper surfaces.

Depending upon the relative positions of the conveyor decks 108, 110, the cut crop material can be released from the agricultural harvesting head 104 at one of three locations across the width of the agricultural harvesting head 104. Each of these release locations and the corresponding conveyor deck positions are indicated in each of the three FIGS. 1-3. To reach each of these positions, both decks are translated bidirectionally along a first deck translation axis that extends parallel to the longitudinal extent of the agricultural harvesting head 104, parallel to the ground, and normal to the direction of travel V of the agricultural vehicle 100 and agricultural harvesting head 102.

In a first configuration, shown in FIG. 1, the two conveyor decks can be shifted as far as possible to the left. Crop material is carried by both conveyor decks over to the right side of the vehicle and deposited in a windrow 118 that extends down the right side of agricultural vehicle 100. The upper surface of the conveyor belts on each conveyor deck are generally coplanar and are aligned at their ends such that all crop passing from one conveyor deck is conveyed to the other conveyor deck seamlessly. There may be some crop leakage, but this crop leakage between the two conveyor decks is insubstantial.

In a second configuration, in which the two conveyor decks are shifted to opposing outermost ends of the agricultural harvesting head 104, the two conveyor decks create a gap therebetween, and generally at the center of the agricultural vehicle 100. In this arrangement, cut crop material will be conveyed by both conveyor decks to a position generally at the center of the agricultural vehicle to form a windrow 120.

In a third configuration, both conveyor decks are shifted to the right as far as possible, leaving a gap on the left side of the vehicle. In this case, the conveyors will carry cut crop material to the left most side of the agricultural harvesting head 104 to create a windrower 122 that extends down the left side of the agricultural vehicle 100.

In order to drive the conveyor belts 114, 116 and to shift the conveyor decks 108, 110, at least four motors are provided. More motors may be added for additional power, but for convenience of illustration only four motors are illustrated in the FIGS. 1-3. Motor 124 is coupled to and drives an end roller 126 that supports conveyor belt 114 which is mounted on conveyer deck 108. Motor 124 causes the conveyor belt to rotate about its two end rollers 126, 128 in the direction indicated by the arrow superimposed on the conveyor belt 114.

In a similar fashion, motor 130 is coupled to and drives an end roller 132 that supports conveyor belt 116 mounted on conveyer deck 110. Motor 130 causes the conveyor belt 116 to rotate about its two end rollers 132, 134 in the direction indicated by the arrow superimposed on conveyor belt 116.

Deck shift motor 136 is coupled to the frame of conveyor deck 108 to shift conveyor deck 108 left and right as commanded by the operator of the vehicle. Deck shift motor 138 is coupled to the frame of conveyor deco 110 to shift conveyor deck 110 left and right as commanded by the operator of the vehicle.

Deck shift motor 136 shifts the left side conveyor deck 108 between the two positions shown in FIG. 2 and FIG. 3. Deck shift motor 138 shifts the right side conveyor deck 110 between the two positions shown in FIG. 1 and FIG. 2.

In FIG. 1, cut crop material that falls on conveyors belt 114 is conveyed across the small gap between conveyor belts 114 and 116 until it reaches the far right end of conveyor belt 116, whereupon it is released and permitted to fall on the ground in the windrow 118.

In FIG. 3, cut crop material that falls on conveyor belt 116 is conveyed across the small gap between conveyor belts 116 and 114 until it reaches the far left end of conveyor belt 114, whereupon they it is released and permitted to fall on the ground in the windrow 122.

Figure 4:
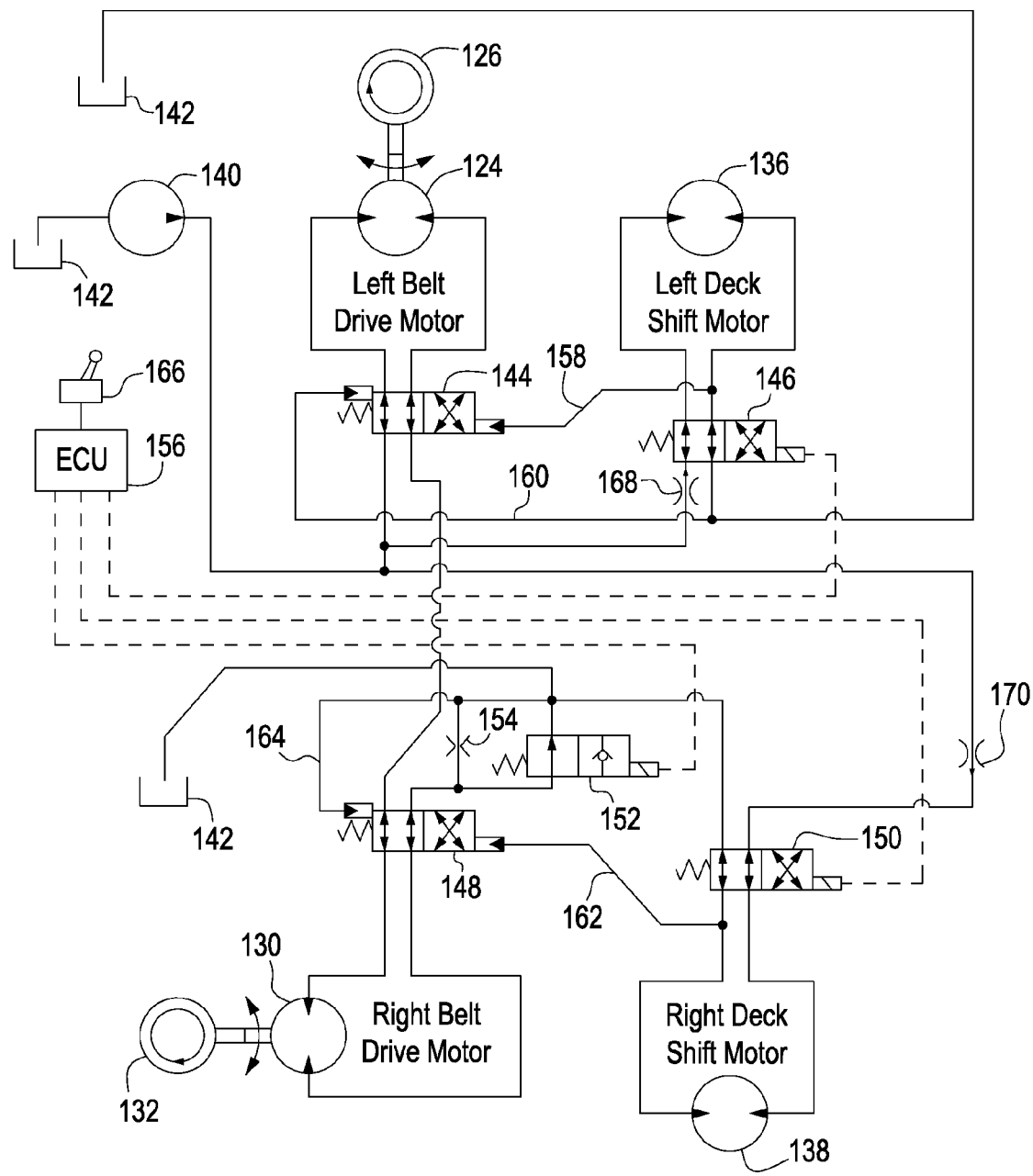
FIG. 4 is a schematic diagram of a hydraulic circuit showing how the motors of the agricultural harvesting head are operated by a conveyor drive system.

FIG. 4 illustrates the control system that coordinates the functioning of the various drive motors. In this diagram, a pressurized hydraulic fluid source 140 provide hydraulic fluid to the motors. Once the fluid is passed through the various components of the illustrated hydraulic circuit, it returns to a hydraulic tank or reservoir 142, from which it is conveyed to the source 140 for recirculation through the system. Hydraulic fluid is provided in parallel to motor 124, motor 136, and motor 138.

Row control valve 144 is disposed between source 140 and motor 124 to control the direction of hydraulic fluid flow through the motor 124. When valve 144 changes its position, it causes motor 124 to reverse its direction of rotation, and therefore reverse the direction of movement of conveyor belt 114.

Flow control valve 146 is disposed between source 140 and motor 136. It controls and direction of flow through the motor 136. When valve 146 changes its position, it causes motor 136 to reverse its direction of rotation and therefore move the conveyor deck 108 to the left or to the right depending upon the position of valve 146. Flow control valve 148 is disposed in a conduit connecting the outlet of motor 124 to the inlet of motor 130 to control the direction of rotation of motor 130. When valve 148 changes its position, it causes motor 130 to reverse its direction of rotation and therefore reverse the direction of movement of conveyor belt 116.

Flow control valve 150 is disposed between source 140 and a motor 138. It controls the direction of flow through motor 138. When valve 150 changes its position, it causes motor 138 to reverse its direction of rotation and therefore move the conveyor deck 110 to the left or to the right depending upon the position of valve 150. Flow control valve 152 is disposed between the outlet of motor 130 and tank 142. In one position, it restricts all flow from the outlet of motor 130 back to tank 142. In the other position, it permits free flow from the outlet of motor 130 to the tank 142. Since fluid flow proceeds from the sewers, through motor 124, then threw motor 130, then threw valve 152 and a back to tank 142, whenever valve 152 is put in its restrictive position (indicated by the check valve in the valve symbol) it prevents all flow through motors 124 and 130. These motors are the belt drive motors. Therefore, when valve 152 is energized, it stops the belts from rotation except for a small rotation provided by a small fluid flow through an orifice 154 disposed in parallel with valve 152.

In this way, when valve 152 is energized, all flow is forced through orifice 154, which is just sufficient to permit the conveyor belts 114, 116 to rotate at a relatively slow speed, but not to consume a significant amount of hydraulic fluid. The hydraulic fluid that is not permitted to go through these two motors 124, 130, is then available for use by either motor 136 or motor 138, to shift the conveyor decks 108, 110, respectively. The ECU 156 is coupled to valves 146, 150, 152 to control their operation. Flow control valve 144 is operated by hydraulic signal lines 158, 160 that are coupled to the conduits on opposing sides of motor 136. Flow control valve 150 is operated by hydraulic signal lines 162, 164 that are coupled to conduits on opposing sides of motor 138.

When flow control valve 148 is shifted to cause motor 136 to shift the conveyor deck 108 in a first direction, the signal lines 158, 160 operate flow control valve 144 to cause of motor 124 to drive the conveyor belt 114 in a first direction.

When flow control valve 146 is shifted to cause motor 136 to shift the conveyor deck 108 in a second direction opposite the first direction, the signal lines 158, 160 operate flow control valve 144 to cause motor 124 to drive the conveyor belt 114 in a second direction opposite the first direction.

Thus, when the operator uses the operator input device 182 to command the system to shift the left conveyor deck 108 to the left, it simultaneously causes the conveyor belt 114 on the left conveyor deck to reverse its direction of travel and move the cut crop material on conveyor belt 114 to the right. Similarly, when the operator it uses the operator input device 162 to command the system to shift the left conveyor deck 108 to the right, it simultaneously causes the conveyor belt 114 on the left conveyor deck 108 to reverse its direction of travel and move the cut crop material on conveyor belt 114 to the left.

Therefore, whenever the left conveyor deck is shifted left the conveyor belt moves crop to the right, and whenever the left conveyor belt is shifted right, the conveyor belt moves crop to the left.

When flow control valve 150 is shifted to cause motor 138 to shift the conveyor deck 110 in a first direction, the signal lines 162, 164 operate flow control valve 148 to cause motor 130 to drive the conveyor belt 116 in a first direction.

When flow control valve 150 is shifted to cause motor 138 to shift the conveyor deck 110 in a second direction opposite the first direction, the signal lines 162, 164 operate flow control valve 144 to cause motor 130 to drive the conveyor belt 116 in the second direction opposite the first direction.

Thus, when the operator manipulates the operator input device 162 to command the system to shift the right conveyor deck 110 to the left, it simultaneously causes the conveyor belt 116 on the right conveyor deck 110 to reverse its direction of travel and move the cut crop material on conveyor belt 118 to the right. Similarly, when the operator uses the operator input device 162 to command the system to shift the right conveyor deck 110 to the right, it simultaneously causes the conveyor belt 116 on the right conveyor deck to reverse its direction of travel and move the cut crop material on conveyor belt 116 to the left.

ECU 156 is coupled to operator input device 162, it is also coupled to and drives flow control valves 146, 150, and 152. ECU 156 enters into a polling loop in which it periodically checks the position of operator input device 162 to see whether the operator has commanded a different position of decks 108, 110. When ECU 156 detects a change in position of operator input device 162 indicating an operator command to move one or more of the conveyor decks 108, 110, ECU 156 first energizes flow control valve 152. When ECU 156 does this, fluid flow through flow control valve 152 is stopped or substantially reduced and most of the hydraulic fluid flow passing through first and second motors 124, 130 passes through orifice 154. Orifice 154 is sized small enough that it substantially reduces all hydraulic fluid flow through motors 124 and 130 compared to the hydraulic fluid flow rate through orifice 154 and valve 152. This reduction in hydraulic fluid flow reduces the speed of the conveyor belts 114, 116 substantially and therefore also substantially reduces the power that motors 124 and 130 consume. This additional hydraulic fluid flow and power is then available used by motors 136, 138 which shift the conveyor decks 108, 110.

ECU 156 de-energizes flow control valve 152 after a predetermined time interval thus permitting the majority of hydraulic fluid flow through the first and second motors 124, 130 to pass through flow control valve 152 and not through orifice 154. This predetermined period is experimentally determined to be long enough to ensure that the conveyor decks 108, 110 being shifted at the operators command will complete shifting before full fluid flow is reapplied to motors 124 and 130 to drive the respective conveyor belts 114, 116 at their full speed. It is desirable to select a predetermined time interval for shifting the conveyor deck that is large enough that the conveyor deck will not bang against mechanical stops or otherwise cause damage to structural members. The time may vary between 1 and 15 seconds. More preferably, it may vary between 2 and 10 seconds. Even more preferably, it may vary between 3 and 8 seconds.

As a further protection against the too-fast shifting of conveyor decks 108, 110, each motor 136, 138 for shifting conveyor decks 108, 110, respectively, is provided with a flow control orifice 168, 170, respectively. These orifices are disposed either in the hydraulic fluid supply line to motors 136, 138, or the hydraulic fluid return line from motors 136, 138. In either case, their presence will reduce the flow rate of hydraulic fluid to the motors 136, 138 and therefore reduce the speed at which the motors convey the conveyor decks 108, 110 when the conveyor decks 108, 110 are shifted.

We claim:

1. A harvesting head (104) with conveyor drive system, comprising:
   a frame (106) configured to extend perpendicular to a direction of travel ("V") during the harvesting process;
   a first conveyor deck (108) supported on the frame (106) for linear translating bidirectional movement with respect to the frame (106) in a first deck axis of translation normal to the direction of travel, the first conveyor deck (108) comprising at least a first roller (126) and a second roller (128) supporting a first conveyor belt (114) for recirculating movement and a first motor (124) coupled to the first roller (126) to drive the first conveyor belt (114) in recirculating movement;
   a third motor (136) coupled to the first conveyor deck (108) to drive the first conveyor deck (108) alternately in two opposing directions that are both parallel to the first deck axis of translation as selected by the operator;
   a second conveyor deck (110) supported on the frame (106) for linear translating bidirectional movement with respect to the frame (106) in the first deck axis of translation, the second conveyor deck (110) comprising at least a third roller (132) and a fourth roller (134) supporting a second conveyor belt (116) for recirculating movement and a second motor (130) coupled to the third roller (132) to drive the second conveyor belt (116) in recirculating movement;
   a fourth motor (138) coupled to the second conveyor deck (110) to drive the second conveyor deck (110) alternately in two opposing directions that are both parallel to the first deck axis of translation as selected by the operator; and
   a conveyor drive system coupled to the first, second, third and fourth motors (124, 130, 136, 138) and configured to reduce hydraulic fluid flow through the first and second motors (124, 130) while shifting either or both of the first and second conveyor decks (108, 110).

2. The harvesting head with conveyor drive system of claim 1, wherein said second conveyor deck (110) is disposed in an end-to-end relationship with the first conveyor deck (108) such that the top surfaces of the first and second conveyor belts (114, 116) are generally coplanar and aligned end-to-end such that crop exiting the first conveyor deck (108) will be transferred substantially entirely to the second conveyor deck (110) when said first and second conveyor decks (108, 110) are shifted into immediately adjacent or abutting positions.

3. The harvesting head of claim 1, wherein the first and second motors (124, 130) are hydraulically coupled together in a series circuit, wherein said series circuit is coupled to and between a source of hydraulic fluid under pressure (140) and a hydraulic fluid reservoir (142), wherein the conveyor drive system further comprises a first orifice (154), and further wherein a majority of hydraulic fluid flow through the first and second motors is forced through the first orifice (154) when either of the conveyor decks (108, 110) are being shifted.

4. The harvesting head of claim 3, wherein the majority of hydraulic fluid flow through the first and second motors (124, 130) bypasses the first orifice (154) when the conveyor decks (108, 110) are not being shifted.

5. The harvesting head of claim 3, wherein the conveyor drive system further comprises a deck shift valve (146) disposed to control the flow of hydraulic fluid to the third motor, and further wherein the deck shift valve (146) is electrically coupled to and controlled by an electronic control unit (156).

6. The harvesting head of claim 1, wherein the conveyor drive system further comprises a first orifice (168) disposed between a source of hydraulic fluid (140) and the third motor (136) to throttle hydraulic fluid flow to the third motor (136), and further comprises a second orifice (170) disposed between the source of hydraulic fluid (140) and the fourth motor (138) to throttle hydraulic fluid flow to the fourth motor (138).

7. The harvesting head of claim 1, further comprising an operator input device (166), end electronic control unit (156) coupled to the operator input device (166), a first flow control valve (152) coupled to the electronic control unit (156) wherein the first flow control valve (152) is actuated by the electronic control unit (156) in response to operator manipulation of the operator input device (166) to change hydraulic fluid flow to first motor (126) and second motor (130) from a higher level of flow to a lower level of flow for a predetermined period of time, and to automatically restore the higher level of flow after the expiration of the predetermined period of time.

8. The harvesting head of claim 7, further comprising a second flow control valve (146) configured to regulate a flow of hydraulic fluid to the third motor (136), wherein the second flow control valve (146) is coupled to the ECU (156), and further wherein the ECU (156) is configured to actuate the second flow control valve (146) and shift the first conveyor deck (108) during the predetermined period of time.

9. A conveyor drive system for a harvesting head (104), the harvesting head including a frame (106) configured to extend perpendicular to a direction of travel ("V") during the harvesting process, a first conveyor deck (108) supported on the frame (106) for linear translating bidirectional movement with respect to the frame (106) in a first deck axis of translation normal to the direction of travel, the first conveyor deck (108) comprising at least a first roller (126) and a second roller (128) supporting a first conveyor belt (114) for recirculating movement and a first motor (124) coupled to the first roller (126) to drive the first conveyor belt (114) in recirculating movement, a third motor (136) coupled to the first conveyor deck (108) to drive the first conveyor deck (108) alternately in two opposing directions that are both parallel to the first deck axis of translation as selected by the operator, a second conveyor deck (110) supported on the frame (106) for linear translating bidirectional movement with respect to the frame (106) in the first deck axis of translation, the second conveyor deck (110) comprising at least a third roller (132) and a fourth roller (134) supporting a second conveyor belt (116) for recirculating movement and a second motor (130) coupled to the third roller (132) to drive the second conveyor belt (116) in recirculating movement, and a fourth motor (138) coupled to the second conveyor deck (110) to drive the second conveyor deck (110) alternately in two opposing directions that are both parallel to the first deck axis of translation as selected by the operator, the conveyor drive system comprising:

a plurality of hydraulic fluid flow control elements couplable to the first, second, third and fourth motors (124, 130, 136, 138), wherein said plurality of hydraulic fluid flow control elements are configured to reduce hydraulic fluid flow through the first and second motors (124, 130) while said plurality of hydraulic fluid flow control elements simultaneously shift either one or both of the first and second conveyor decks (108, 110).

10. The conveyor drive system of claim 9, further comprising a source of hydraulic fluid under pressure (140), a hydraulic fluid reservoir (142), and a first orifice (154), wherein the first and second motors (124, 130) are hydraulically couplable together in a series circuit, wherein said series circuit is couplable to and between the source of hydraulic fluid under pressure (140) and the hydraulic fluid reservoir (142), and further wherein the plurality of hydraulic fluid flow control elements are configured to direct a majority of hydraulic fluid flow through the first and second motors through the first orifice (154) when either of the conveyor decks (108, 110) are being shifted.

11. The conveyor drive system of claim 10, wherein plurality of hydraulic fluid flow control elements are configured to direct the majority of hydraulic fluid flow passing through the first and second motors (124, 130) not through the first orifice (154) when the conveyor decks (108, 110) are not being shifted.

12. The conveyor drive system of claim 10, wherein the plurality of hydraulic fluid flow control elements further comprises an electronic control unit (156), and a deck shift valve (146) configured to control the flow of hydraulic fluid to the third motor (136), and further wherein the deck shift valve (146) is electrically coupled to and controlled by the electronic control unit (156).

13. The conveyor drive system of claim 9, wherein the plurality of hydraulic fluid flow control elements further comprises a first orifice (168) configured to be disposed between a source of hydraulic fluid under pressure (140) and the third motor (136) to regulate a rate of hydraulic fluid flow to the third motor (136), the plurality of hydraulic fluid flow control elements further comprising a second orifice (170) configured to be disposed between the source of hydraulic fluid under pressure (140) and the fourth motor (138) to regulate a rate of hydraulic fluid flow to the fourth motor (138).

14. The conveyor drive system of claim 9, wherein the plurality of hydraulic fluid flow control elements further comprises an operator input device (166), an electronic control unit (156) coupled to the operator input device (166), a first flow control valve (152) coupled to the electronic control unit (156) wherein the first flow control valve (152) is actuated by the electronic control unit (156) in response to operator manipulation of the operator input device (166) to change hydraulic fluid flow to first motor (126) and second motor (130) from a higher level of flow to a lower level of flow for a predetermined period of time, and to automatically restore the higher level of flow after the expiration of the predetermined period of time.

15. The conveyor drive system of claim 14, wherein the plurality of hydraulic fluid flow control elements further comprises a second flow control valve (146) configured to regulate a flow of hydraulic fluid to the third motor (136), wherein the second flow control valve (146) is coupled to the ECU (156), and further wherein the ECU (156) is configured to actuate the second flow control valve (146) and shift the first conveyor deck (108) during the predetermined period of time.

* * * * *